(12) United States Patent
Amorim et al.

(10) Patent No.: US 7,240,230 B2
(45) Date of Patent: Jul. 3, 2007

(54) DISTRIBUTED GLOBAL CLOCK FOR CLUSTERS OF COMPUTERS

(75) Inventors: Cláudio Luis Amorim, Rio de Janeiro (BR); Alberto Ferreira de Souza, Vitória (BR)

(73) Assignee: COPPE/UFRJ - Coordenacao dos Programas de Pos Graduacao de Engenharia da Universidade Federal do Rio de Janeiro, Rio de Janeiro (BR)

( * ) Notice: Subject to any disclaimer, the term of this patent is extended or adjusted under 35 U.S.C. 154(b) by 11 days.

(21) Appl. No.: 10/541,475

(22) PCT Filed: Sep. 16, 2003

(86) PCT No.: PCT/BR03/00130

§ 371 (c)(1),
(2), (4) Date: Jul. 6, 2005

(87) PCT Pub. No.: WO2004/063913

PCT Pub. Date: Jul. 29, 2004

(65) Prior Publication Data

US 2006/0212738 A1      Sep. 21, 2006

(30) Foreign Application Priority Data

Jan. 10, 2003    (BR) .................................. 0300100

(51) Int. Cl.
*G06F 1/12*      (2006.01)
*G06F 15/16*     (2006.01)

(52) U.S. Cl. ..................................... 713/400; 709/248
(58) Field of Classification Search ............... 713/400, 713/600

See application file for complete search history.

(56) References Cited

U.S. PATENT DOCUMENTS

| | | | | |
|---|---|---|---|---|
| 5,416,808 A * | 5/1995 | Witsaman et al. | .......... | 375/356 |
| 5,579,513 A * | 11/1996 | Strohmer | .......... | 713/600 |
| 5,822,381 A * | 10/1998 | Parry et al. | .......... | 375/356 |
| 6,614,862 B1 * | 9/2003 | Doblar | .......... | 375/354 |
| 6,981,063 B1 * | 12/2005 | Eggers et al. | .......... | 709/248 |
| 2002/0066110 A1 * | 5/2002 | Cloonan et al. | .......... | 725/111 |

* cited by examiner

*Primary Examiner*—Thomas Lee
*Assistant Examiner*—Ji H. Bae
(74) *Attorney, Agent, or Firm*—Fildes & Outland, P.C.

(57) ABSTRACT

The present invention refers to a global clock system for clusters or networks of computers implemented entirely in hardware. The system uses a specifically designed hierarchical network to distribute clock pulses that are used to increment time counters in the cluster' nodes. In addition, this network enables any node of the cluster to send a reset signal to the other nodes so that all local time counters are initialized simultaneously and remain automatically synchronized afterwards. In this way, each processor in the cluster is able to obtain the value of the global clock whenever accessing its own local time counter. The reset signal is the only function that is implemented in software.

8 Claims, 5 Drawing Sheets

DISTRIBUTED GLOBAL CLOCK FOR CLUSTERS OF COMPUTERS

TECHNICAL FIELD

The present invention refers to the synchronization of time clocks in distributed systems composed of multiple computers. In particular, it describes a global clock system that allows each computer in a cluster or network of computers to read the global clock in a fast and independent way.

PREVIOUS TECHNIQUES

In a cluster or network of computers, in which multiple computers are interconnected by a communication network, each processor of the cluster works asynchronously in accord to its time clock or local oscillator. However, many parallel and distributed applications for clusters can benefit from a common time base, namely a global clock, that allows events, processes, and transactions, which are generated over the execution of the applications, to synchronize and to be ordered.

Global clocks can be implemented in software, hardware, or a combination of both. In the case of all-software implementation of global clocks, probabilistic algorithms are used for clock synchronization. In these algorithms, one processor is elected as the master that coordinates the initial process of synchronization by sending messages over the network to the others and measuring the time spent for point-to-point communication. Next, the master processor sends a message to each processor to initialize its local clock. Each message the master sends contains an appropriate constant to be added to the initial value of each processor's local clock. The value of each constant takes into account the transit time of each message that was sent to each processor during the initial synchronization process. In addition, the local clocks have to be re-synchronized periodically, since they operate in an independent way, and thus do not obey necessarily the same clock frequency of the master processor. The main disadvantage of global clocks implemented in software is their low precision due to the variation of time for transmitting messages over a network.

Another solution is to use a single oscillator and the hardware of the interconnection network to implement the global clock in a way that all the local clocks obey a single clock frequency. In this scheme, every processing node has a local time clock, and all local clocks increment their value according to a single oscillator. In addition, an algorithm is used to initialize all the counters so that they operate synchronously. Global clocks that use both hardware and software are well more precise than those based purely on software solutions.

SUMMARY OF INVENTION

This invention refers to a global clock system, implemented entirely in hardware, for clusters or network of computers. The global clock system we invented comprises a central oscillator module and associated logic, local time counter modules, which are connected preferably to the I/O buses of the cluster nodes, and cables for interconnections. The invention allows that, once any node of the cluster sends a reset signal, all the local time counters will be initiated and synchronized automatically. After that, each processor will be able to know the value of the global clock by checking its own local counter. The reset signal is the only function that is implemented in software.

The invention uses a central oscillator to generate pulses and to increment, in a synchronous way, the local time counter of each cluster's processor. Once the reset signal is triggered, the system will initialize all the local counters simultaneously. The simultaneity is guaranteed by the size of the cables used for interconnection, which should be approximately of the same size, and by the hardware that works together with the central oscillator. Once all the counters are initialized, they will be incremented simultaneously by the central oscillator and will always contain the same value of time elapsed since initialization.

The size of the cables can vary, provided they vary within certain limits that guarantee that the propagation time of the reset signal between the central oscillator and each local time counter does not exceed the cycle time of the central oscillator. More specifically, for a given frequency f (in Hertz) of the global clock, the difference d (in meters) of cable' sizes from the central oscillator to each local time counter cannot exceed:

$$d = \frac{v}{f}$$

Where v (in meters/second) is the speed of propagation of electromagnetic signals through the cables. As an example, with typical communication cables, that use copper wires, and a global clock frequency equal to 100 MHz, the cables may vary to the limit of two meters. In this case, the accuracy of the global clock will be of the order of magnitude of hundredths of microseconds.

The global clock system can be used in clusters of several sizes. For this purpose, the module of the central oscillator, or pulse generator module, should be implemented with a fixed number of connections to the processors that compose the cluster, and an extra connection to accommodate other cluster' sizes. Clusters of larger sizes can be built using the extra connection to link other modules in a tree-like fashion with several levels.

In case of implementing clusters with more than one level, the pulse generator modules within the intermediate levels will not use their oscillators—they will receive the clock pulses of the modules above them in the hierarchy. In addition, these intermediate modules will propagate to the level above the reset signals they received from the points below in the hierarchy, and to the level below the reset signals they received from the points above in the hierarchy.

A pulse generator module identifies itself as an intermediate module or the top one by using either a pulse detection circuit associate with an electronic key or an electro-mechanic key.

BRIEF DESCRIPTION OF DRAWINGS

These and other objectives, advantages and characteristics of the invention are easier to understand if the detailed description below is read with the following figures.

DETAILED DESCRIPTION OF INVENTION

Figure 1:
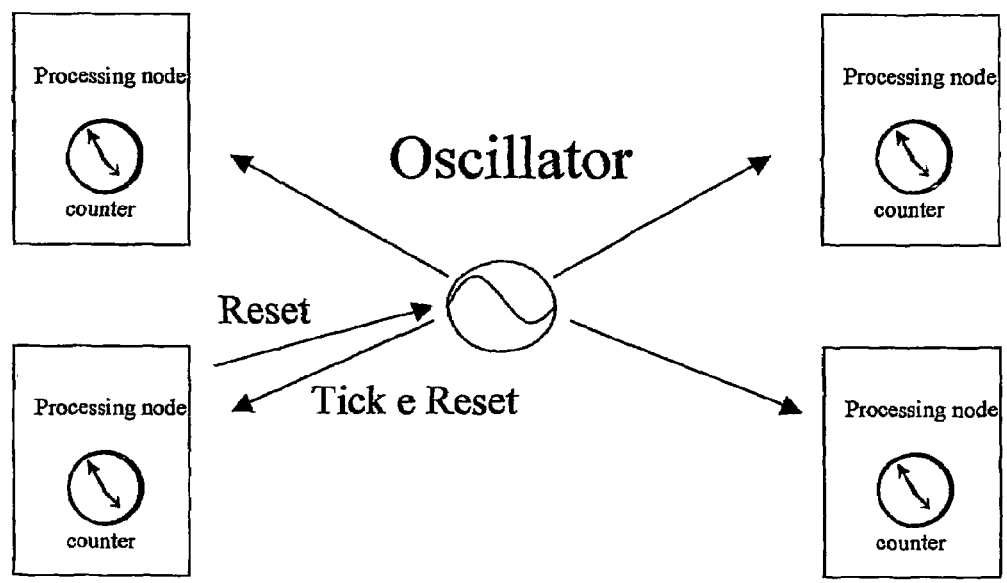
FIG. 1 shows the general architecture of the global clock system used in the present invention for a cluster with 4 processing nodes.

FIG. 1 illustrates the global clock system for a 4-node cluster. As shown in the figure, the central oscillator generates pulses that increment synchronously the local counters in the processing nodes. The figure shows the reset signal, which can be generated by any of the processors, that is used to initialize all the counters simultaneously. After the reset is issued, the counters of all nodes will be incremented simultaneously by the central oscillator.

Figure 2:
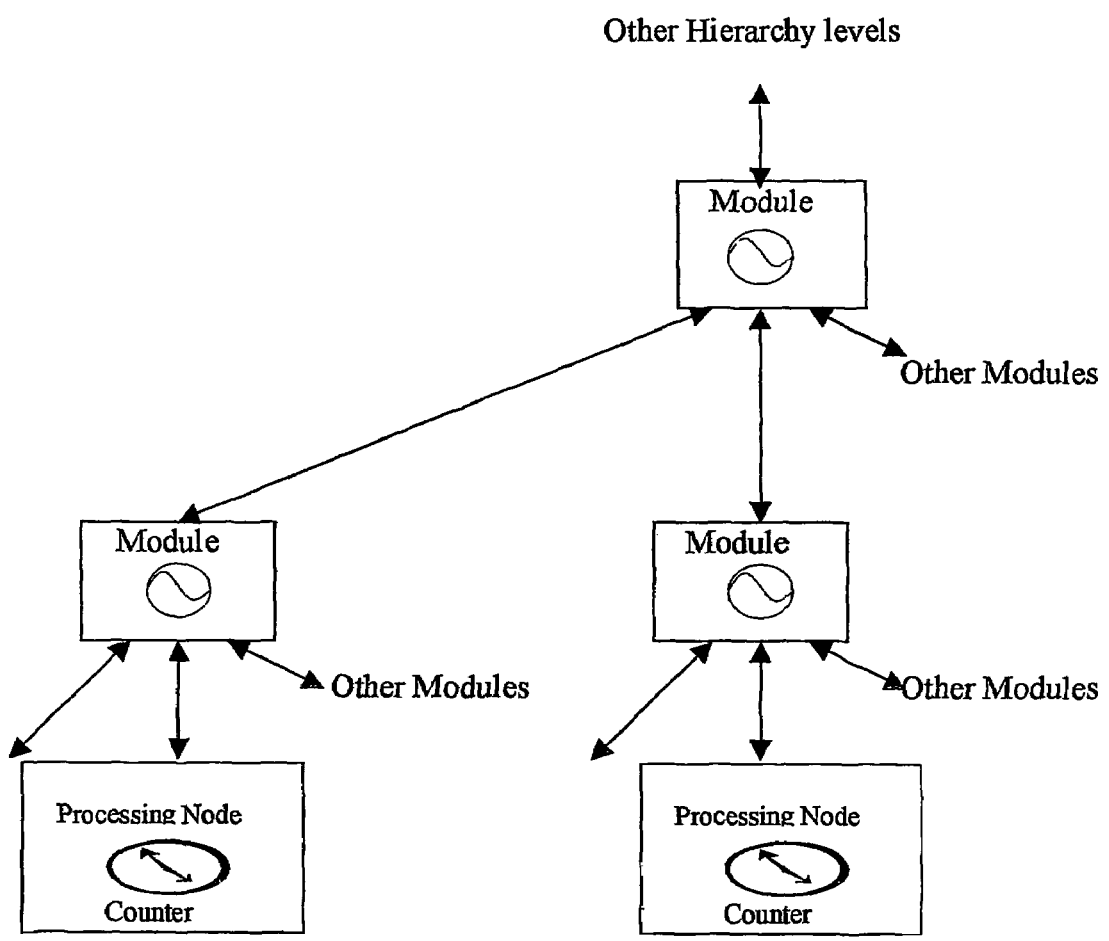
FIG. 2 shows the hierarchical architecture of the global clock system with several levels used in the present invention.

The global clock can support an increasing number of processors by using a hierarchical structure of pulse generator modules as shown in FIG. 2. As can be seen in the Figure, each module contains a fixed number of connections to the processors that compose the cluster and an extra connection to the other modules, forming a tree-like structure. The modules in the intermediate levels do not use their oscillators, but receive pulses from the module above in the hierarchy. In addition, intermediate modules propagate the reset signals they receive from the modules above in the hierarchy to the modules below, and vice-versa. Each module uses a circuit for pulse detection associated with an electronic key to self identify as either an intermediate or the top module. An electro-mechanic key can also be used for this purpose.

In FIG. 2, each intermediate pulse generator module uses an OR gate to join all the incoming reset signals received from the points below in the hierarchy. The OR gate's output is transmitted up in the hierarchy to allow the reset of the global clock. An incoming reset signal that comes from either other pulse generator module or processing node in another point in the hierarchy goes up to until reaching the pulse generator module at the top of the hierarchy.

The module at the top of the hierarchy uses an OR logical gate to join the reset signals that arrive to it. The OR gate has as many inputs as the number of incoming reset signals that arrive to it (or it uses an AND gate, if the reset signals were active on zero). The output of this logic gate is the reset signal that goes down in the hierarchy of pulse generator modules until arriving simultaneously into all the processing nodes in the cluster.

In each pulse generator module, the reset signal that goes down in the hierarchy is amplified by using buffers to ensure scalability. Like the hardware of the local time counters, the hardware of the modules can also be connected to the I/O busses of the cluster's processors, taking advantage of the available power supply.

Figure 3:
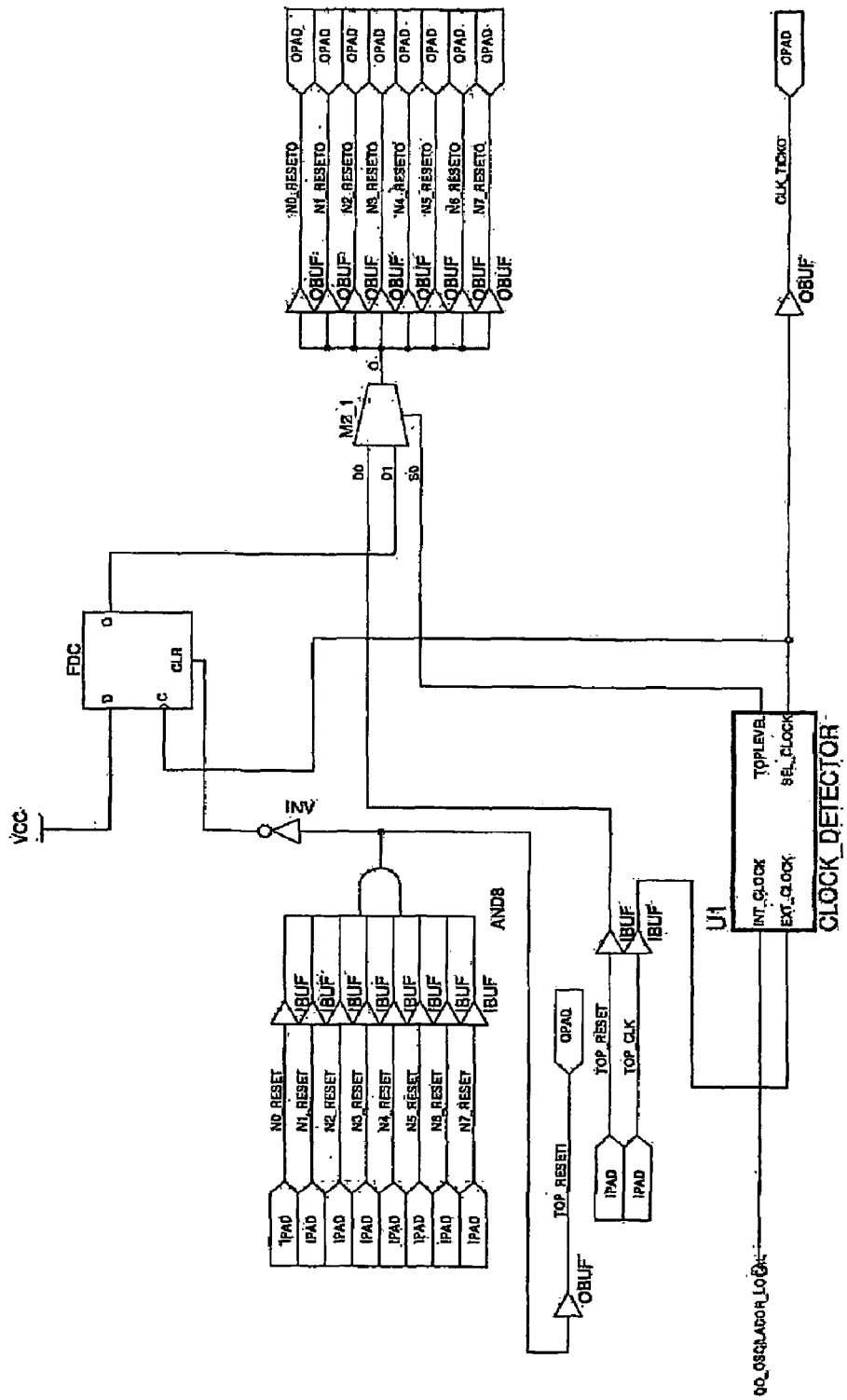
FIG. 3 shows the diagram of the pulse generator module circuit of the global clock.

The cables that interconnect the pulse generator modules that form the hierarchical tree, and these to the counter modules of the processing nodes, can vary in size provided such variation is kept within certain limits that guarantee that the time difference to propagate the reset signal between any pair of counters does not exceed the cycle time of the central oscillator. Thus, given a certain global clock frequency equal to f (in Hertz), the difference d (in meters) between cable sizes from the top module to each counter cannot exceed the following value:

$$d = \frac{v}{f}$$

Where v (in meters/second) is the speed of propagation of electromagnetic signals through the cables. FIG. 3 shows the diagram of our prototype of the pulse generator module of the global clock. The diagram is shown only for illustration purpose since other implementations following the specifications of the present invention are also possible.

In the prototype, we use a pulse detector, identified as CLOCK_DETECTOR in FIG. 3, to verify automatically whether or not the module is at the top of the hierarchy. If it is the top module then the EXT_CLOCK input of the Module's CLOCK_DETECTOR will not receive pulses, since that input is used to receive pulses from modules higher in the hierarchy. The CLOCK_DETECTOR circuit of the top module detects the absence of pulses in EXT_CLOCK, links its INT_CLOCK input, which receives pulses from the module's local oscillator, to the SEL_CLOCK output, which is linked to the OBUF buffer whose output sends the pulses to lower levels in the hierarchy. The CLOCK_DETECTOR circuit generates a true logic level in its TOPLEVEL output also. If it is an intermediate module, there are pulses in the EXT_CLOCK input of the CLOCK_DETECTOR. In this case, CLOCK_DETECTOR detects the existence of pulses in the EXT_CLOCK input, links its EXT_CLOCK input to SEL_CLOCK output, and generates a false logic level in its TOPLEVEL output.

Reset signals that come from lower levels in the hierarchy are referred to as N0_RESET, N1_RESET, . . . , N7_RESET, as shown in the diagram of FIG. 3 (note that in our prototype each pulse generator can be connected up to eight modules or processing nodes at lower levels of the hierarchy). These signals pass through IBUF buffers and are linked to the inputs of the AND gate of eight inputs AND8. If any of these inputs is activated (logic value zero), then the AND8 output switches to zero. This zero value will be communicated to the higher levels through the OBUF buffer linked to the AND8 output, in case of existing higher levels, and will also change the Q output of the D-type synchronous flip-flop identified as FDC in FIG. 3 to zero using its CLR input (via the INV inverter). If it is a top module, then the logic level of the CLOCK_DETECTOR's TOPLEVEL output will be true. This true logic level will set the M2_1 multiplex, through its control input' S0, so that its D1 input will be multiplexed to its O output. The Q output of the FDC flip-flop will then pass through the multiplex, generating the reset signals N0_RESETO, N1_RESETO, . . . , N7_RESETO to the lower levels. If it is not the top module, the M2_1 multiplex will multiplex D0 to its O output, enforcing reset signals generated to the lower levels to come from the IBUF linked to the TOP_RESET signal, which brings the reset signal coming from higher levels of the hierarchy.

Figure 4:
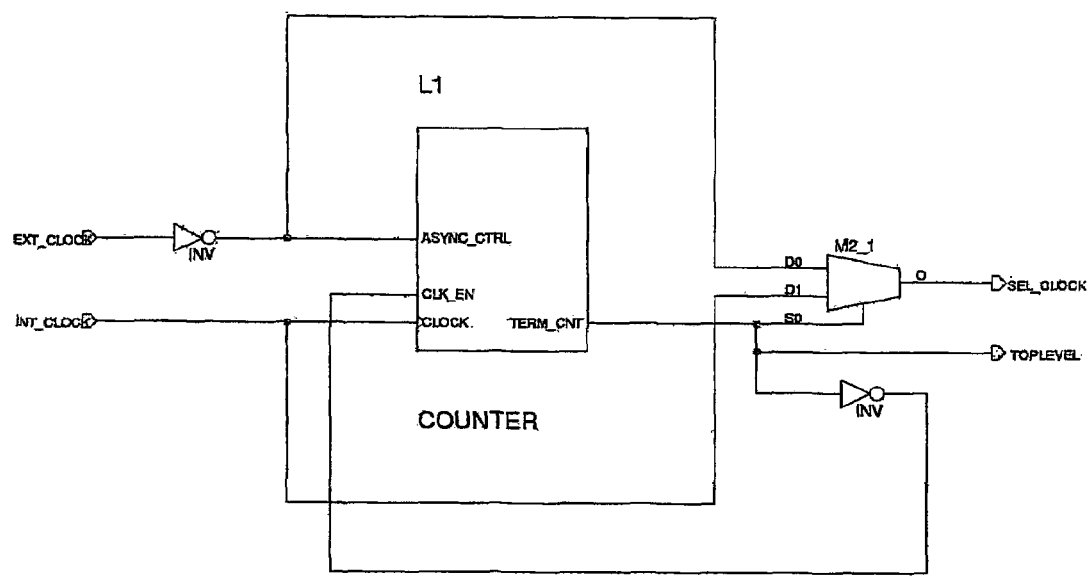
FIG. 4 shows the diagram of the pulse detector circuit.

A logical diagram of the pulse detector we used in our module prototype is shown in FIG. 4. In this figure, L1 (COUNTER) is a binary counter of three bits. This counter has an asynchronous reset input named ASYNC_CTRL. This input is linked through the INV inverter to the EXT-CLOCK signal, which brings pulses from modules at higher levels of the hierarchy. If a module is not the top module, the EXT_CLOCK signal does not have pulses and is kept at the high logic level (as inactive in the prototype). This logic level will be inverted by INV, so that it will not cause the counter to be reset by ASYNC_CTRL. In this case, the internal module's pulses that come from INT_CLOCK will activate the L1 counter, which will count until its output reaches the maximum allowed binary value (8, since it is a 3-bit counter). Once the counter's value is maximum, its TERM_CNT output (end-of-counting) changes to the true logic value. This true logic value inhibits, through its CLK_EN input (via the INV inverter), extra increments to the counter. In addition, the TERM_CNT signal set the M2_1 multiplex connecting its D1 input to its O output, in order to make the output signal SEL_CLOCK of this pulse detector equal to the pulses that come from the INT_CLOCK.

In case the module is not the top one there are pulses in EXT_CLOCK coming from modules above in the hierarchy. Thus, the TERM_CNT output will be always equal to zero, which sets the M2_1 multiplex connecting its D0 input to its O output, making the output signal of the pulse detector equal to the pulses that come from the EXT_CLOCK. Each one of these pulses will clear the L1 counter, never allowing it to count until its maximum.

Figure 5:
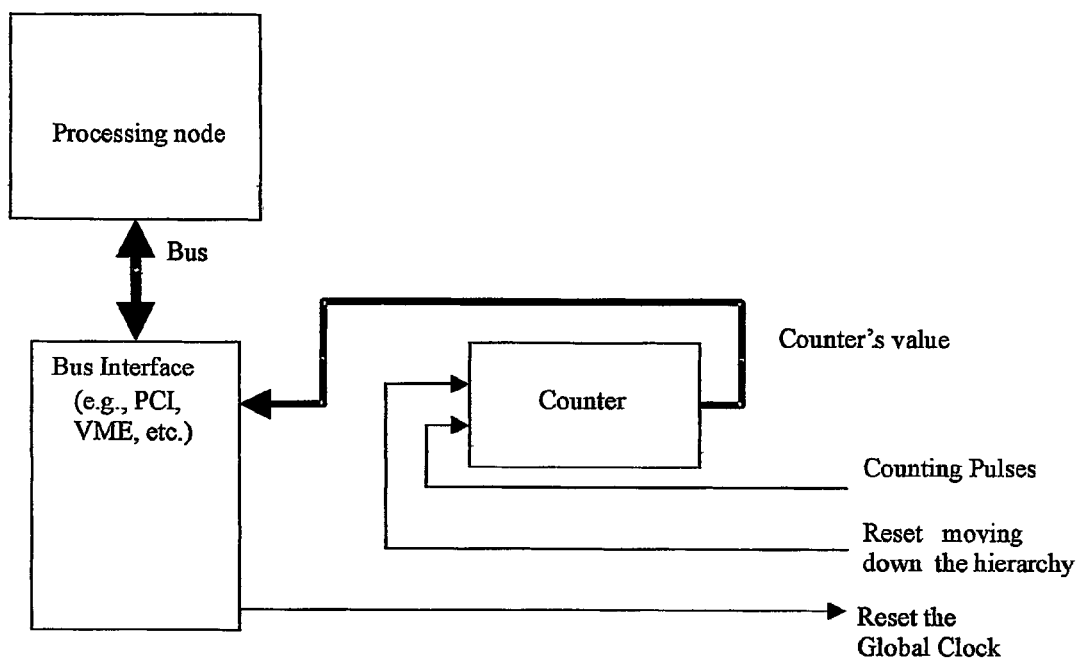
FIG. 5 shows the diagram of the global clock counter module.

In each processing node, the hardware of the global clock, or the counter module, is quite simple and its block diagram is shown in FIG. 5, inside of a box. The hardware is composed of an interface with the bus of the processing unit and a counter. The interface allows any processing node to initialize the global clock and to read the counter value, which can have as many bits as necessary (64 bits in the prototype we implemented).

Under the command of the processor in the processing node, a reset signal can be issued by the interface (FIG. 5). This signal arrives at the first module through one of the lines N0_RESET, N1_RESET, etc., as shown in FIG. 3, and goes up through the module hierarchy until it reaches the top module. The signal goes back synchronously through the modules arriving at all counters simultaneously. This ensures that, after initialization, simultaneous reads of counter values in different processing nodes will result in reading the same counting of time (number of pulses counted) since the initialization. To avoid race conditions in reading the counter value (the counter can be in the middle of an increment at the moment of a read) it must be synchronized with the global clock pulse.

The invention claimed is:

1. A distributed global clock for clusters of computers having a plurality of processing nodes, the distributed global clock comprising:
   a plurality of pulse generator modules that are interconnected forming a hierarchical structure with a single said pulse generator module at the top of said hierarchical structure; this said single pulse generator module generating clock pulses that are sent down through said hierarchical structure;
   a plurality of local time counter modules, one for each node of the cluster; each said local time counter module containing a counter that is incremented by the pulses sent by said single pulse generator module at the top of said hierarchical structure;
   a plurality of interconnecting cables for interconnecting said local time counter modules to said pulse generator modules, and these said pulse generator modules among themselves forming said hierarchical structure; the lengths of said interconnecting cables varying within limits that guarantee that a difference in propagation time of signals coming from said single pulse generator module at the top of said hierarchical structure and reaching any pair of said local time counter modules does not exceed a cycle time of the pulses generated by said single pulse generator module at the top of said hierarchical structure; and
   a means for any processing node to provide a reset signal to its said local time counter module for simultaneous initialization of all said local time counter modules of the distributed global clock;
   once provided, said reset signal is sent up through said hierarchical structure of said pulse generator modules, reaches said single pulse generator module at the top of said hierarchical structure, and is sent back down through said hierarchical structure of said pulse generator modules reaching all said local time counter modules simultaneously;
   on arrival from said pulse generator modules, said reset signal initializes the counters of all said local time counter modules simultaneously and, after such initialization, the pulses generated by said single pulse generator module at the top of said hierarchical structure increment synchronously the counters of all said local time counter modules of the distributed global clock.

2. A distributed global clock for clusters of computers according to claim 1, characterized by said interconnecting cables having a specific length varying within limits that guarantee that a difference in propagation time of said reset signal between said single pulse generator module at the top of said hierarchical structure and any pair of said local time counter modules does not exceed the cycle time of the pulses generated by said single pulse generator module at the top of said hierarchical structure.

3. A distributed global clock for clusters of computers according to claim 1, characterized by said interconnecting cables having lengths varying up to d meters, with $d=v/f$, where v (in meters/second) is a propagation speed of electromagnetic signals through said interconnecting cables and f (in Hertz) is a frequency of the pulses generated by said single pulse generator module at the top of said hierarchical structure; said frequency being a frequency of the distributed global clock.

4. A distributed global clock for clusters of computers according to claim 1, characterized in that, in said hierarchical structure of said pulse generator modules, each said pulse generator module contains a fixed number of connections to said pulse generator modules directly below in said hierarchical structure, or to said local time counter modules if said pulse generator module is at the bottom of said hierarchical structure of said pulse generator modules, and an extra connection to interconnect it with said pulse generator module above in said hierarchical structure.

5. A distributed global clock for clusters of computers according claim 1, where each said pulse generator module has one of:
   a pulse detector apparatus associated with a connection of said pulse generator module, which allows said pulse generator module to detect automatically whether or not it is at the top of said hierarchical structure; and
   an electromechanical key to tell to said pulse generator module that it is at the top of said hierarchical structure.

6. A distributed global clock for clusters of computers according to claim 1, characterized by a means of propagating clock pulses through said interconnecting cables such that said pulse generator modules in intermediate levels of said hierarchical structure:
   propagate clock pulses received from said pulse generator modules above in said hierarchical structure to said pulse generator modules below in said hierarchical structure, or to said local time counter modules if said pulse generator module is at the bottom of said hierarchical structure of said pulse generator modules; and
   propagate reset signals received from said pulse generator modules below in said hierarchical structure, or from said local time counter modules if said pulse generator module is at the bottom of said hierarchical structure of said pulse generator modules, to said pulse generator modules above in said hierarchical structure and vice-versa.

7. A distributed global clock for clusters of computers according to claim 1, characterized by a means of propagating reset signals through said interconnecting cables such that:
  reset signals provided by any processing node are sent by the corresponding said local time counter modules to said hierarchical structure of said pulse generator modules;
  each said pulse generator module uses a logical OR gate to join all reset signals that arrive to it (or an AND gate, if the reset signals are active on logical zero) coming from said pulse generator modules below in said hierarchical structure (or from said local time counter modules if said pulse generator module is at the bottom of said hierarchical structure of said pulse generator modules); and
  the output of this OR gate (or an AND gate, if the reset signals are active on logical zero) is sent below or above said hierarchical structure, depending on whether said pulse generator module is at the top of said hierarchical structure or not, respectively.

8. A distributed global clock for clusters of computers according to claim 1, characterized by a means of propagating the reset signals through said interconnecting cables where said single pulse generator module at the top of said hierarchical structure joins the reset signals that arrive to it using a logical OR gate (or an AND gate, if the reset signals are active on logical zero) and sends the output of this logical gate to said pulse generator modules below in said hierarchical structure; the reset signal propagating down through said hierarchical structure until arriving simultaneously, within the same clock cycle, into all said local time counter modules.

* * * * *